(12) United States Patent  
Pörner

(10) Patent No.: US 6,619,730 B2
(45) Date of Patent: Sep. 16, 2003

(54) VEHICLE BODY HAVING A STRUTTING CONFIGURATION AT A BOTTOM SIDE OF THE VEHICLE BODY

(75) Inventor: Frank Pörner, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/166,476

(22) Filed: Jun. 10, 2002

(65) Prior Publication Data

US 2002/0175538 A1 Nov. 28, 2002

Related U.S. Application Data

(63) Continuation of application No. PCT/EP00/11303, filed on Nov. 15, 2000.

(30) Foreign Application Priority Data

Dec. 10, 1999 (DE) .......................................... 199 59 607

(51) Int. Cl.[7] ......................... B62D 21/15; B62D 21/06; B62D 21/10
(52) U.S. Cl. .................. 296/204; 296/203.02; 296/188; 280/784; 280/790; 180/311
(58) Field of Search .......................... 296/204, 203.02, 296/203.04, 185, 205, 188; 280/788, 798, 781, 790, 794, 793, 784; 180/311

(56) References Cited

U.S. PATENT DOCUMENTS

| 4,521,049 A |   | 6/1985  | Genma et al. |           |
|-------------|---|---------|--------------|-----------|
| 4,811,812 A | * | 3/1989  | Cassese      | 180/295   |
| 4,951,964 A | * | 8/1990  | Sakamoto et al. | 280/788 |
| 5,085,484 A | * | 2/1992  | Mori         | 296/204   |
| 5,417,454 A | * | 5/1995  | Adams        | 280/794   |
| 5,556,133 A | * | 9/1996  | Oku et al.   | 280/781   |
| 5,685,599 A | * | 11/1997 | Kitagawa     | 296/204   |
| 5,797,647 A | * | 8/1998  | Mehrkens et al. | 296/204 |
| 6,099,039 A | * | 8/2000  | Hine         | 280/781   |
| 6,131,685 A | * | 10/2000 | Sakamoto et al. | 280/784 |
| 6,193,274 B1 | * | 2/2001 | Brown et al. | 280/784   |
| 6,220,655 B1 | * | 4/2001 | Gure et al.  | 296/203.02 |
| 6,293,615 B1 | * | 9/2001 | Tarahomi     | 296/194   |
| 6,354,627 B1 | * | 3/2002 | Kasuga       | 280/781   |
| 6,398,262 B1 | * | 6/2002 | Ziech et al. | 280/788   |
| 6,402,173 B1 | * | 6/2002 | Chiu         | 280/781   |
| 6,450,276 B1 | * | 9/2002 | Latcau       | 296/194   |
| 6,460,918 B1 | * | 10/2002 | Sato et al. | 296/204   |
| 2002/0029921 A1 | * | 3/2002 | Dau et al. | 280/784 |
| 2002/0033594 A1 | * | 3/2002 | Yamamoto et al. | 280/781 |
| 2002/0040819 A1 | * | 4/2002 | Miyata     | 180/311   |

FOREIGN PATENT DOCUMENTS

| DE | 767 141     | 8/1951 |
| DE | 31 39 458 A1 | 6/1982 |
| DE | 39 05 650 C2 | 1/1990 |
| DE | 42 27 668 A1 | 2/1994 |
| DE | 42 44 217 A1 | 6/1994 |

(List continued on next page.)

Primary Examiner—D. Glenn Dayoan
Assistant Examiner—H. Gutman
(74) Attorney, Agent, or Firm—Laurence A. Greenberg; Werner H. Stemer; Manfred Beck

(57) ABSTRACT

A vehicle body includes a main frame having two longitudinal members. An auxiliary frame is fixed to the main frame. A cross member is fixed to the longitudinal members in the end region of the vehicle and is provided with a connecting section which extends in the transverse direction of the vehicle. A strutting configuration forms an essentially horizontal continuation of the auxiliary frame in the direction of the vehicle end. One end of the strutting configuration is fixed to points on the auxiliary frame which are spaced apart from each other in the transverse direction of the vehicle. The other end of the strutting configuration is fixed to the connecting section of the cross member. A vehicle body is thus obtained which has an improved stiffness all the way to the end of the vehicle and which is particularly useful for open vehicles without a roof structure.

19 Claims, 6 Drawing Sheets

FOREIGN PATENT DOCUMENTS

| | | |
|---|---|---|
| DE | 43 29 532 A1 | 3/1995 |
| DE | 195 32 531 A1 | 3/1997 |
| DE | 198 10 123 A1 | 9/1999 |
| EP | 0 603 536 B1 | 6/1994 |
| EP | 0 941 912 A1 | 9/1999 |
| JP | 03 122 788 | 5/1991 |

* cited by examiner

VEHICLE BODY HAVING A STRUTTING CONFIGURATION AT A BOTTOM SIDE OF THE VEHICLE BODY

CROSS-REFERENCE TO RELATED APPLICATION

This application is a continuation of copending International Application No. PCT/EP00/11303, filed Nov. 15, 2000, which designated the United States and was not published in English.

BACKGROUND OF THE INVENTION

Field of the Invention

The invention relates to a vehicle body having a strutting configuration in the vicinity of the floor of the vehicle body.

In order to improve the torsional and flexural rigidity of self-supporting or unit-construction vehicle bodies, additional strutting configurations are fitted in the region of the underbody of the vehicle body. This is practiced particularly in the case of open vehicles, in order to reduce torsional vibrations about the longitudinal axis of the vehicle and in order to reduce transverse bending of the vehicle end, because the stiffening action of the vehicle roof is missing in the case of open vehicles. However, stiffening struts are also used in the case of closed vehicles in order to impart the necessary stiffness to lightweight constructions, at points which are particularly stressed.

European Patent No. EP 0 603 536 B1 discloses a vehicle body for a sports car which has outer, lateral longitudinal members in the region of a passenger cell. The longitudinal members extend into a rear engine compartment and, in the region of the rear wheels, are tapered toward the longitudinal central axis of the vehicle and are offset upward. A V-shaped stiffening configuration which is formed from two struts and the tip of which points in the direction of the vehicle rear is fastened to the lateral longitudinal members. The stiffening configuration extends from the vehicle underbody in an essentially horizontal manner on the rear side. In this case, the tip of the stiffening configuration is supported via further stiffening struts against the longitudinal members bounding the engine compartment. The further stiffening struts are likewise disposed in a V-shaped manner, when viewed in a vertical plane transverse with respect to the longitudinal direction of the vehicle. As a result, a spatial double-V-configuration is produced, the tips of which converge in a point in a longitudinal central plane of the vehicle.

A further self-supporting vehicle body or unit-construction body having stiffening struts in the floor region is disclosed in German Patent No. DE 39 05 650 C2. The body includes outer, lateral longitudinal members in the floor region of a passenger compartment and further longitudinal members which are offset toward the central axis of the vehicle and upward and extend to a front engine compartment. In this case, the stiffening struts bridge the transition between the longitudinal members in the region of the front wheel arch apertures and are positioned at an angle of approximately 45 degrees with respect to the longitudinal central axis of the vehicle without being connected to one another. Each of these hi struts is fastened at one end to one of the outer, lateral longitudinal members. The other end is fastened to a crossmember, which is attached in the region of the engine compartment to the longitudinal members and extends below an engine approximately in the region of the wheel arch apertures. This results mainly in an increased rigidity in the transitional region of the longitudinal members at the height of the wheel arch apertures.

Further strut configurations for stiffening a vehicle body in the floor region are disclosed, for example, in Published, Non-Prosecuted German Patent Application No. DE 31 39 458 A1 or German Patent No. DE 767 141 PS.

Furthermore, U.S. Pat. No. 5,417,454 discloses a vehicle body having diagonally disposed strutting devices in the vicinity of the floor. The strutting devices extend from a crossmember, which is fastened on the end side of the longitudinal members of a main frame, to a further crossmember situated in front of it. This measure is intended to obtain a reduction in vibrations in the vehicle floor.

Furthermore, a motor vehicle having a planar stiffening element is disclosed in Published European Patent Application No. EP 0 941 912 A1. The stiffening element spans the space between the longitudinal members and extends as far as a front crossmember at the front end of the motor vehicle and is essentially fastened to the longitudinal members and to the front crossmember.

SUMMARY OF THE INVENTION

It is accordingly an object of the invention to provide a vehicle body which overcomes the above-mentioned disadvantages of the heretofore-known vehicle bodies of this general type and which has an improved torsional and flexural rigidity.

With the foregoing and other objects in view there is provided, in accordance with the invention, a vehicle body, including:

a main frame including an underbody and two longitudinal members, the main frame defining a longitudinal vehicle direction, a transverse vehicle direction and a vehicle end region;

the longitudinal members extending from the underbody to the vehicle end region such that the longitudinal members are offset upwardly with respect to the underbody;

an auxiliary frame fastened to the main frame and extending from the underbody toward the vehicle end region;

a crossmember fastened to the longitudinal members at the vehicle end region;

the crossmember having a downwardly projecting connecting section disposed substantially level with the auxiliary frame and extending substantially horizontally in the transverse vehicle direction;

the longitudinal members having respective end sections, the connecting section having axial ends and turning, at the axial ends, into upwardly extending sections extending from the axial ends of the connecting section to the end sections of the longitudinal members; and a strutting configuration extending substantially horizontally from the auxiliary frame toward the vehicle end region, the strutting configuration having a first end fastened to the auxiliary frame at locations spaced apart from one another in the transverse vehicle direction, and the strutting configuration having a second end fastened to the connecting section of the crossmember.

In other words, the object of the invention is achieved by a vehicle body having a strutting configuration in the vicinity of the floor, the vehicle body including a main frame having it two longitudinal members which run to one end of the vehicle and are offset upward with respect to a vehicle underbody, an auxiliary frame which is fastened to the main frame and continues the underbody of the main frame in the direction of the end of the vehicle, a crossmember which is fastened to the longitudinal members in the end region of the vehicle and has a connecting section which projects downward to the ground side, extends essentially horizontally in the transverse direction of the vehicle and is disposed essentially level with the auxiliary frame and which merges at its axial end in each case into a section, which extends essentially vertically or is inclined upwardly, and leads to an end section of one of the longitudinal members, and the vehicle body including a strutting configuration, which essentially horizontally continues the auxiliary frame in the direction of the vehicle end, is fastened with one end thereof to the auxiliary frame, at points which are spaced apart from one another in the transverse direction of the vehicle, and is fastened with the other end thereof to the connecting section of the crossmember.

This allows shifting the fastening position or articulation position of the strutting configuration, which is fastened to a component of high structural rigidity, relatively far toward the front end or rear end of the vehicle. This results in a further improvement in the static and also dynamic rigidity in a region of the front part of the vehicle or rear part of the vehicle which is in the vicinity of the floor and is important for the vibration behavior of the entire vehicle.

Furthermore, a particularly space-saving construction of the crossmember is obtained, such that the construction does not obstruct units or auxiliary units to be positioned, for example, in the region of the engine compartment.

Especially when relatively heavy masses are to be attached to one end of the vehicle, the configuration according to the invention substantially reduces torsional vibrations and thus the vehicle body is stabilized in the transverse direction of the vehicle. By reinforcing the front end of the vehicle or the vehicle rear, vibrations of the longitudinal members to and fro in the transverse direction in a horizontal plane of the vehicle are also reduced. The solution according to the invention is suitable in particular for providing a stiffening configuration which can be retrofitted in a simple manner to a mass-produced vehicle whose basic version is a closed vehicle with a roof structure and whose body is used as a basis for an open vehicle without a roof structure.

According to a preferred embodiment of the invention, the installation outlay of the entire, additional stiffening configuration, which is formed of the crossmember and the strutting configuration, can be reduced by providing the crossmember as a one-piece element.

According to an advantageous embodiment of the invention, the strutting configuration is formed by two struts which converge toward one another in a V-shaped manner in a direction toward the vehicle end. This provides an additional stiffening effect which is obtained in an advantageously simple manner. In particular, it is also possible to easily retrofit a configuration of this type onto a finished vehicle.

The struts are preferably articulated in a common point on the crossmember. As a result, the struts can be connected to the crossmember in a single working step without requiring a great outlay.

According to an alternative embodiment of the invention, the strutting configuration is embodied as a flat thrust frame which is fastened to the crossmember along the connecting section extending in the transverse direction of the vehicle. This provides a particularly high stiffening effect that extends all the way to the vehicle end. The thrust frame can also be used for closing off an engine compartment toward the ground side.

In order to save weight, the strutting configuration is preferably configured as an essentially rectangular outer frame having diagonal struts.

In accordance with another advantageous embodiment of the invention, the strutting configuration can be produced in a particularly simple manner if the strutting configuration is configured as a one-piece sheet-metal element having four triangular recesses which are positioned in the manner of a clover leaf and, for example, can simply be punched out of the sheet-metal element.

In a further advantageous embodiment of the invention, wheel carriers for the wheels of a vehicle axle are supported on the auxiliary frame such that the auxiliary frame is situated below the wheel axes whereas the longitudinal members extend over the wheel axes. This produces a cage-like construction of high rigidity surrounding, for example, the engine compartment or trunk of a vehicle. The auxiliary frame fulfills the dual function of supporting the wheel carriers of the wheels of a vehicle axle and of an additional transverse stiffening of the vehicle body in the region of the wheel arc apertures.

The auxiliary frame is preferably fastened to a section of a floor panel which is disposed between the longitudinal members. This measure allows the auxiliary frame to be fastened to a section of the underbody of the main frame, wherein this section of the underbody is positioned as far as possible toward the end of the vehicle where the longitudinal members already bend upward. In comparison with the conventional stiffening configurations explained above, the length which is to be spanned by the strutting configuration and, in particular, by the stiffening struts between the various sections of the main frame therefore remains short, so that a good reinforcement or stiffening of the front part or rear part of the vehicle is obtained. Moreover, the free clearance of the vehicle is not adversely affected.

In accordance with a further advantageous embodiment of the invention, an end frame is fastened to the free ends of the longitudinal members, the end frame extending in an essentially vertical orientation in a plane transverse to the longitudinal direction of the vehicle. In case the end frame is a front end frame, the latter is used for holding the lighting equipment and, if appropriate, a radiator of the vehicle. The end frame can be fitted in its entirety as a constructional unit onto the front ends of the longitudinal members.

The crossmember is preferably disposed as an independent component directly next to the end frame, on a side toward the vehicle, in the longitudinal direction of the vehicle. In other words, the crossmember is disposed directly adjacent to the end frame such that the end frame is disposed behind the crossmember when looking from the auxiliary frame along the longitudinal vehicle axis toward the crossmember.

However, according to an alternative embodiment, the crossmember is also fastened to the end frame itself. This permits a strength-optimized reinforcement of the end frame. Furthermore, it is possible to pre-assemble the crossmember together with the end frame then to fasten this unit to the free end sections of the longitudinal members.

The crossmember is preferably integrated in the front end frame and forms a one-piece element with the latter, with the result that the previously described pre-assembly step can be omitted.

Other features which are considered as characteristic for the invention are set forth in the appended claims.

Although the invention is illustrated and described herein as embodied in a vehicle body having a strutting configuration in the vicinity of the floor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
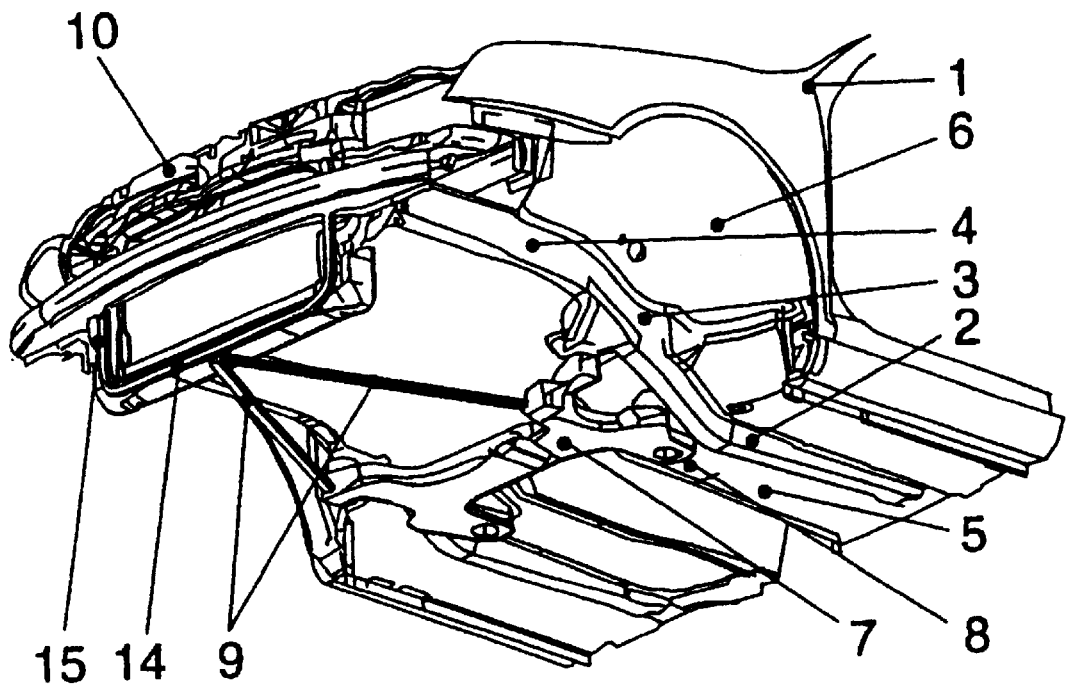
FIG. 1 is a partial, perspective view of a first exemplary embodiment of a vehicle body according to the invention for illustrating the stiffened front part of the vehicle body.
Figure 2:
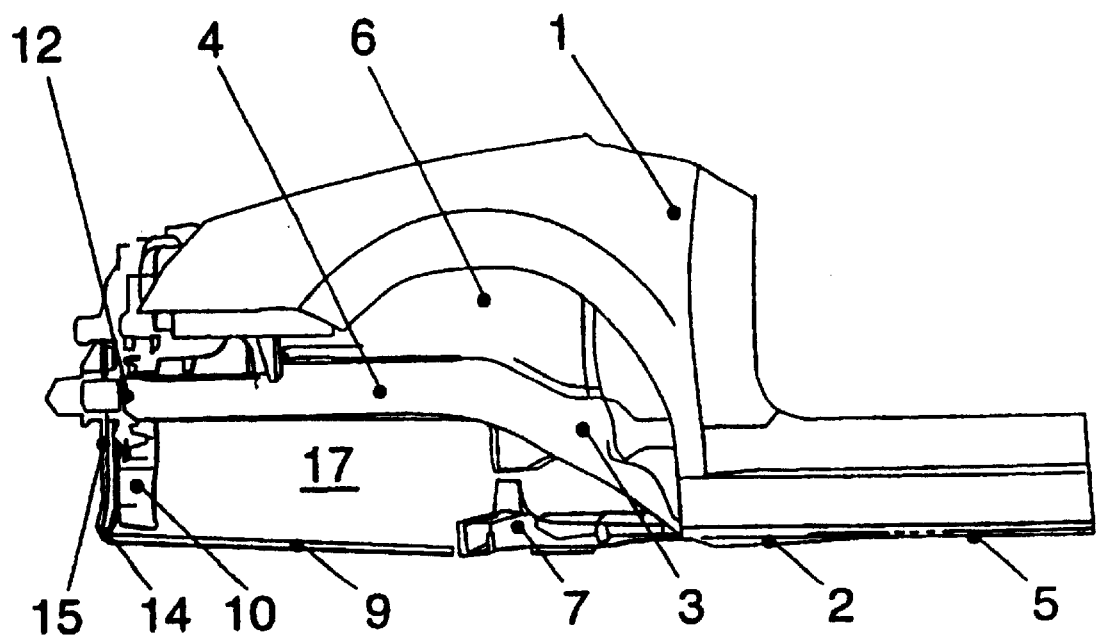
FIG. 2 is a side elevational view of the front part of the vehicle body shown in FIG. 1.

Referring now to the figures of the drawings in detail and first, particularly, to FIG. 1 thereof, there is shown a first exemplary embodiment of a vehicle body with a stiffened front part of the vehicle. The vehicle body includes a self-supporting main frame 1 which has, inter alia, two approximately parallel longitudinal members which extend in the longitudinal direction of the vehicle. The longitudinal vehicle direction is understood as extending from end to end of a vehicle, whereas the transverse vehicle direction is understood as extending from side to side of a vehicle. Each of the longitudinal members has a box-like cross-sectional profile. Each of the longitudinal members has an essentially horizontally extending section 2 under the vehicle underbody 5. The essentially horizontally extending section 2 is adjoined in the region of body recesses 6 for the vehicle wheels, also called wheel arch apertures, by a transitional section 3 which is inclined upward in the direction toward the front end and may, if appropriate, also taper toward the center of the vehicle. The latter is the case in particular if the essentially horizontally extending sections 2 are in each case positioned between the vehicle wheels on a side of the vehicle. The inclined transitional section 3 extends, as can be seen in particular from FIG. 2, above the rotational axes of the vehicle wheels and subsequently merges again into a longitudinal section 4 which extends essentially horizontally to the front end of the vehicle. In the exemplary embodiment illustrated, the longitudinal sections 4 extend along the side of an engine compartment 17 and serve, inter alia, for supporting an engine and also further units disposed in the engine compartment 17.

A front end frame 10 which extends essentially in a vertical plane transverse to the longitudinal direction L of the vehicle is fastened to the free ends of the longitudinal members, i.e. to the front end sections 12 of the longitudinal sections 4 arranged at the side of the engine compartment 17. The front end frame 10 serves, inter alia, for holding the front lighting equipment of the vehicle and a radiator, and has corresponding recesses 16 for this purpose. If appropriate, a fender is fastened to the front end frame 10. In order to facilitate the manufacture, the front end frame 10 is configured as a module which is fastened as a unit to the free ends of the longitudinal members.

Figure 3:
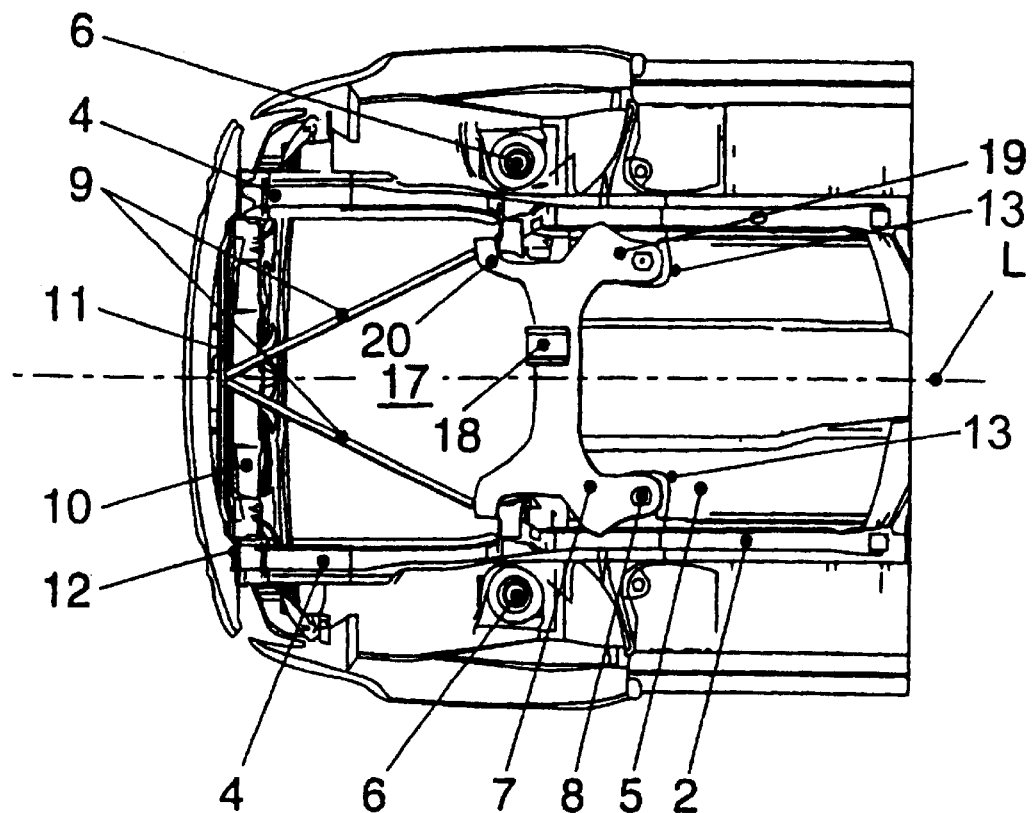
FIG. 3 is a bottom view of the front part of the vehicle body shown in FIG. 1.
Figure 4:
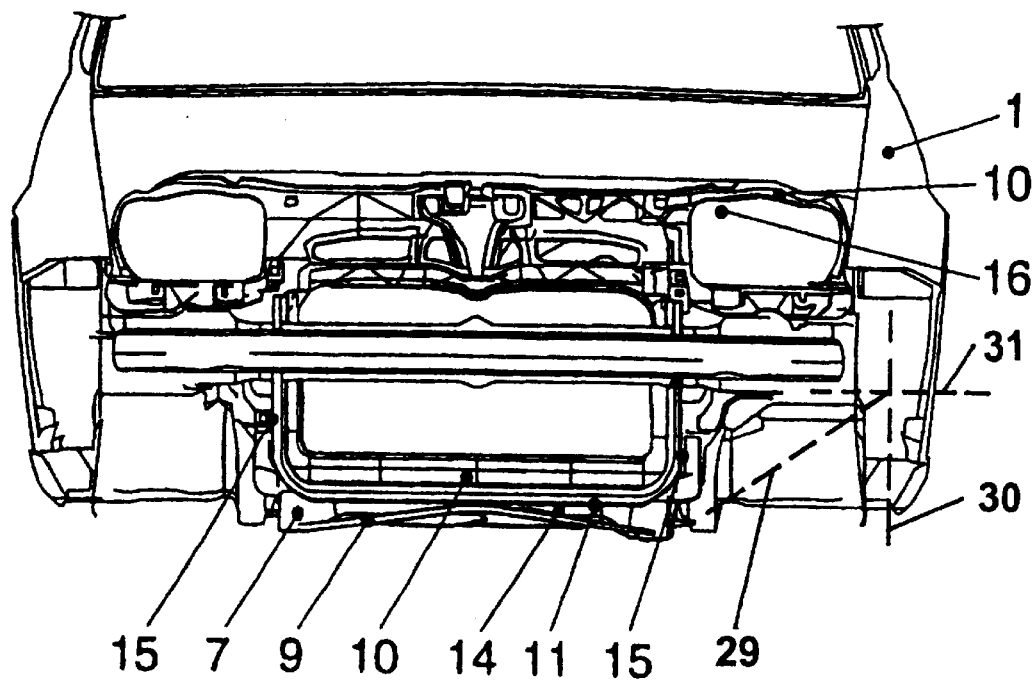
FIG. 4 is a front elevational view of the front part of the vehicle body shown in FIG. 1.
Figure 5:
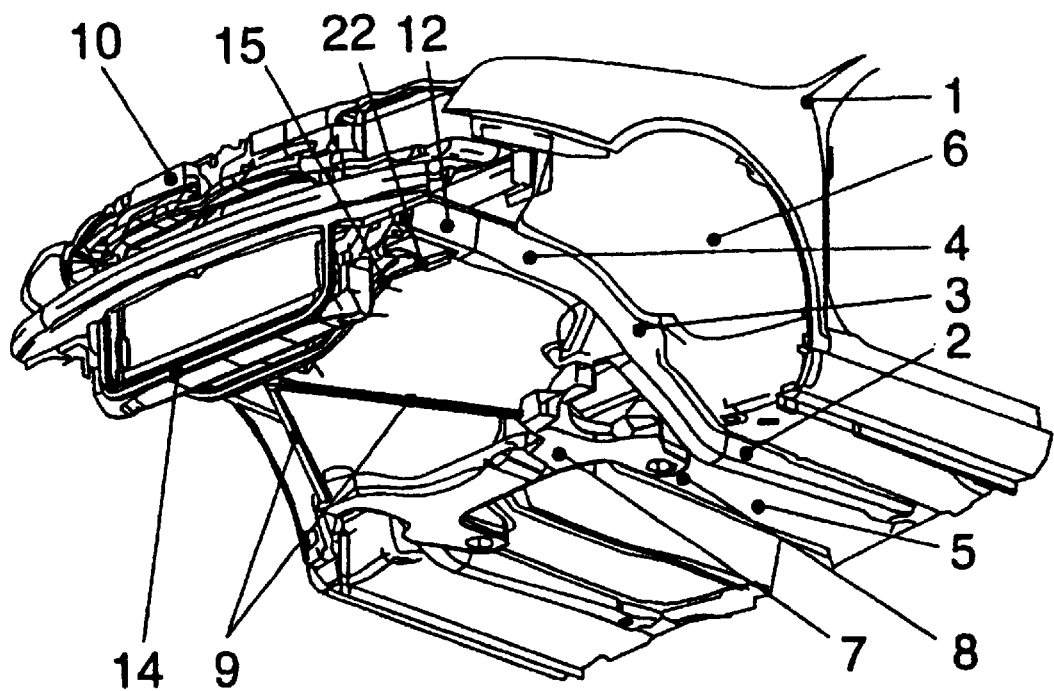
FIG. 5 is a partial, perspective view of a second exemplary embodiment of a vehicle body according to the invention for illustrating the stiffened front part of the vehicle body which differs from the first exemplary embodiment by its crossmember configuration.
Figure 6:
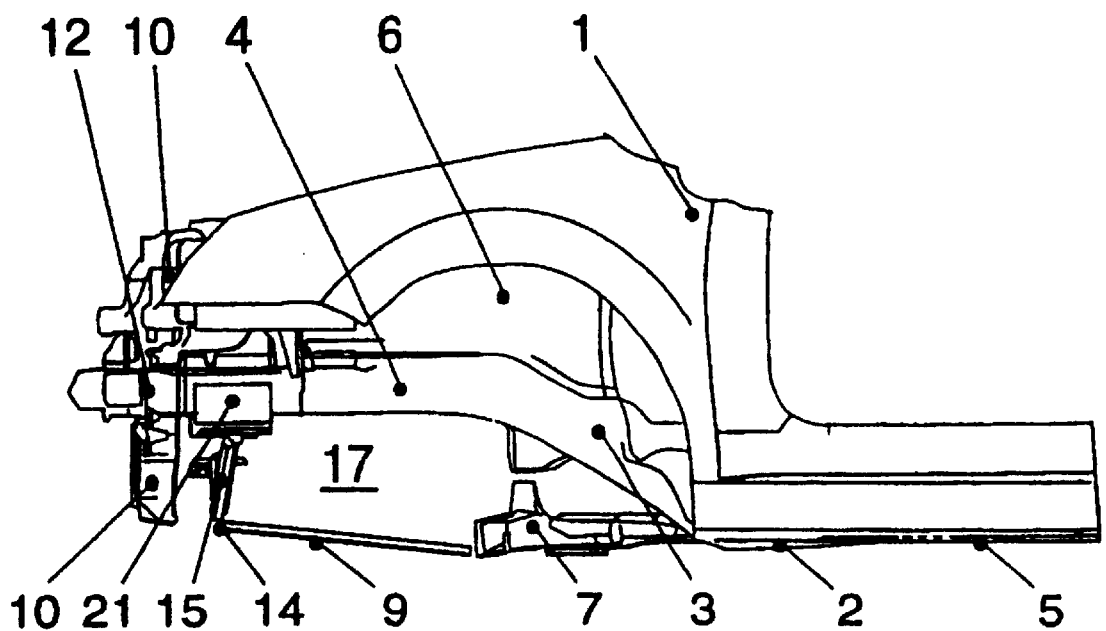
FIG. 6 is a side elevational view of the front part of the vehicle body shown in FIG. 5.
Figure 7:
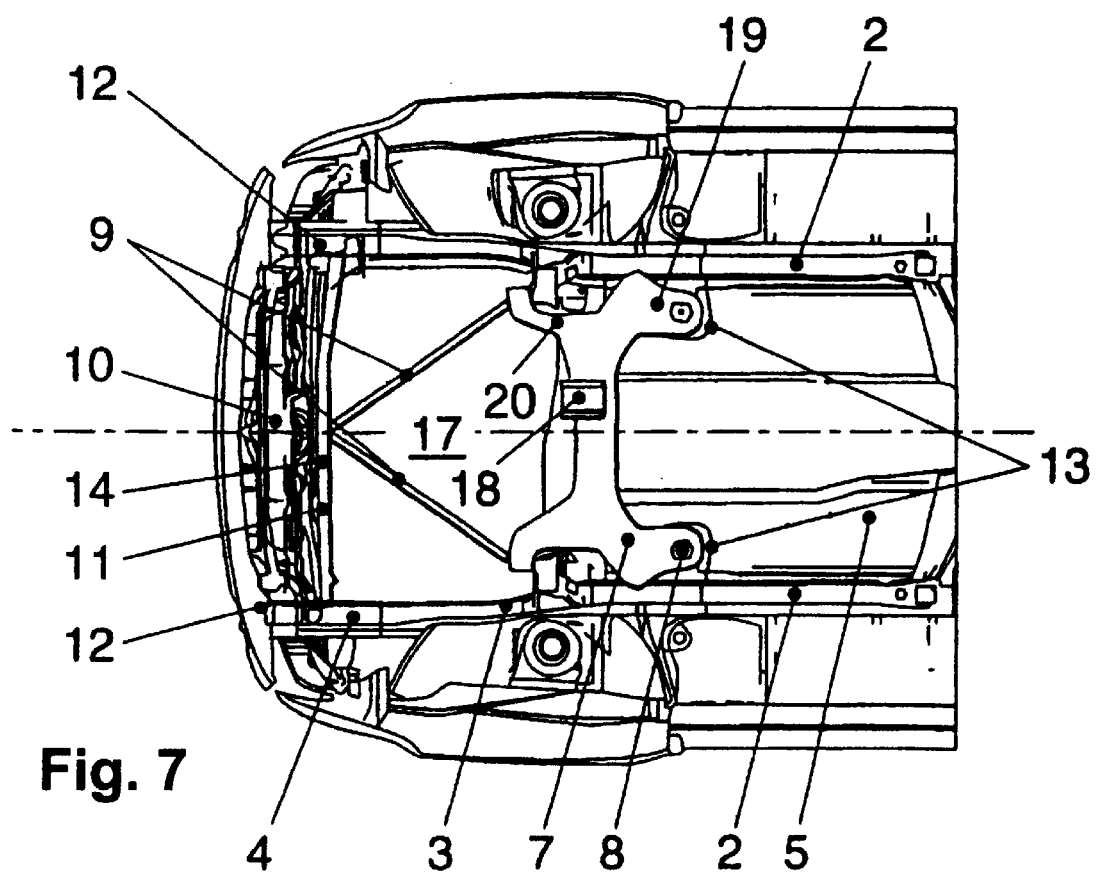
FIG. 7 is a bottom view of the front part of the vehicle body shown in FIG. 5.
Figure 8:
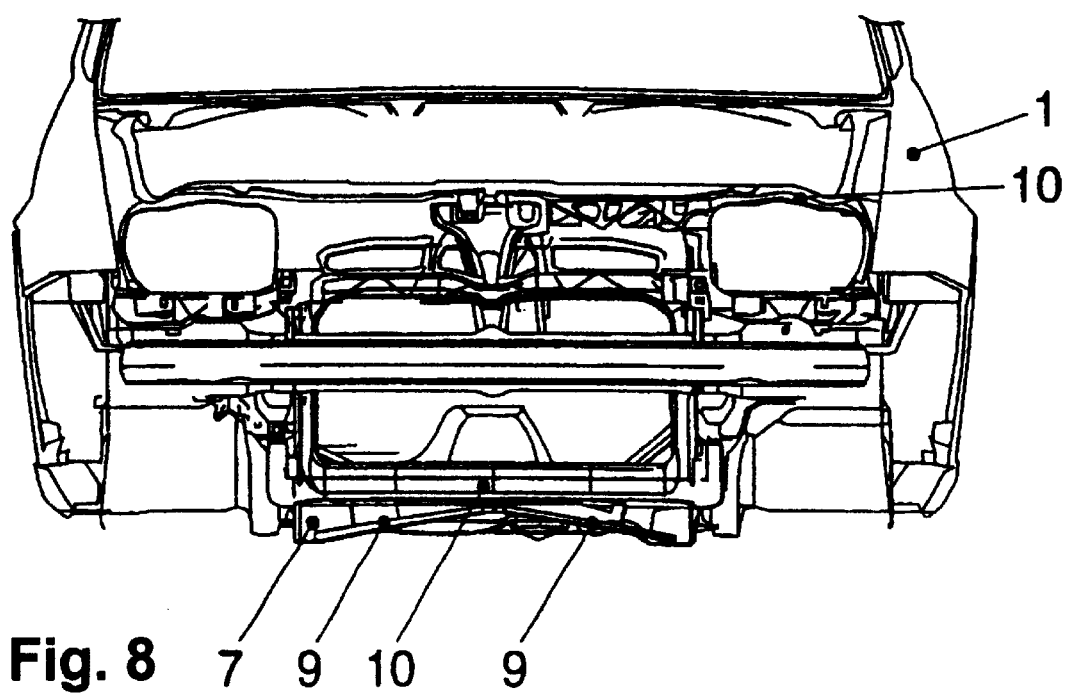
FIG. 8 is a front elevational view of the front part of the vehicle body shown in FIG. 5.

Furthermore, an auxiliary frame 7 on which, inter alia, the wheel carriers 29 of the front wheels 30 of the vehicle are supported, is fitted in the vicinity of the floor to the main frame 1 of the vehicle body. A wheel carrier 29, a wheel 30 and a wheel axis 31 are only schematically illustrated as dashed lines in FIG. 4. The auxiliary frame 7 is disposed below the wheel axles of the front wheels. It can be seen from FIG. 2 that the auxiliary frame 7 essentially continues the underbody 5 of the vehicle horizontally toward the front end thereof. The auxiliary frame 7 has, as can be seen in particular from FIG. 3, an approximately H-shaped form with a central support 18 which extends between the front wheels in the transverse direction of the vehicle. The central support 18 is adjoined, on the rear side of the auxiliary frame 7, in the vicinity of the wheel, by two fastening projections 19. Through the use of the fastening projections 19, the auxiliary frame 7 is attached, for example screwed with bolts 8, to two essentially horizontally extending floor-panel sections 13 of the vehicle underbody 5, the fastening points of the fastening projections 19 being provided on the vehicle underbody 5 between the horizontally extending sections 2 of the longitudinal members.

A projection 20 pointing to the front end is provided on the central support 18 of the auxiliary frame 7, in each case in the vicinity of a wheel. A strutting configuration or bracing configuration in the form of two essentially horizontally extending struts 9 which, in the exemplary embodiment illustrated, extend below the engine compartment 17 is provided between the auxiliary frame 7 and the front end frame 10. The struts 9 are in each case fastened with one end to one of the projections 20, which are spaced apart from one another in the transverse direction of the vehicle, while the other end is fastened to a crossmember 11 at the front end of the vehicle. In this case, the struts 9 converge in a V-shaped manner toward the front end where they are, for example, at an angle of 45 degrees with respect to the longitudinal central axis L of the vehicle.

In the first exemplary embodiment, the crossmember 11 is configured as a tubular bracket and provided in front of the front end frame 10. The end sections 12 of the longitudinal members are connected to each other via the crossmember 11. In order to make it possible that the stiffening struts 9 can extend essentially horizontally, the crossmember 11 has a connecting section 14 which projects toward the ground below the vehicle and extends in the transverse direction of the vehicle. The stiffening struts 9 are preferably articulated in a common point in the center of the connecting section 14 such that the common point is provided along the longitudinal central axis L of the vehicle. The connecting section 14 merges at its axial ends into essentially vertically extending sections 15 which lead to the end sections 12 of the longitudinal members.

The sections 3, 4, 12 of the longitudinal members which are provided in the region of the engine compartment, the auxiliary frame 7, the stiffening struts 9 and the integrally configured crossmember 11 form a frame construction of high rigidity, which surrounds the engine compartment 17 in a cage-like manner in the floor region. This construction reduces in particular the occurrence of torsional and bending vibrations on the vehicle body.

In the case of the first exemplary embodiment illustrated in FIGS. 1 to 4, the crossmember 11 is configured as a separate component which is fastened to the front end frame 10, with the result that the crossmember 11 can be fitted together with the front end frame 10 to the end sections 12 of the longitudinal members.

In an alternative variant, the crossmember 11 can also be entirely integrated in the front end frame 10, i.e. can be integrally formed with the latter as a one-piece element, for which purpose the front end frame 10 is reinforced at the corresponding points of the crossmember 11.

A further exemplary embodiment is illustrated in FIGS. 5 to 8. The main frame 1 and the auxiliary frame 7 are configured just like in the first exemplary embodiment according to FIGS. 1 to 4. Furthermore, a front end frame 10 which is connected to the end sections 12 of the longitudinal members is again provided. In contrast to the first exemplary embodiment, here the tubular crossmember 11 is not attached directly to the front end frame 10, but is provided directly next to the latter, on the side situated toward the vehicle. Nonetheless, the crossmember 11 connects the longitudinal members, which are provided at the side of the engine compartment 17, at their end sections 12 and the crossmember 11 is connected, via stiffening struts 9 provided in a V-shape, to projections 20 provided on the auxiliary frame 7.

As in the first exemplary embodiment, in order to ensure an essentially horizontal extension of the stiffening struts 9, the crossmember 11 is provided with a connecting section 14 which projects downward, and extends horizontally in the transverse direction of the vehicle and in the center of which the stiffening struts 9 are articulated. The connecting section 14 merges at its axial ends into upwardly extending, inclined sections 15 which lead to the end sections 12 of the longitudinal members. The inclined sections 15 then taper off into approximately horizontally extending ends 22 which are coupled in each case to a supporting yoke 21 which is fastened, for example welded, in each case to an end section 12 of one of the longitudinal members.

Figure 9:
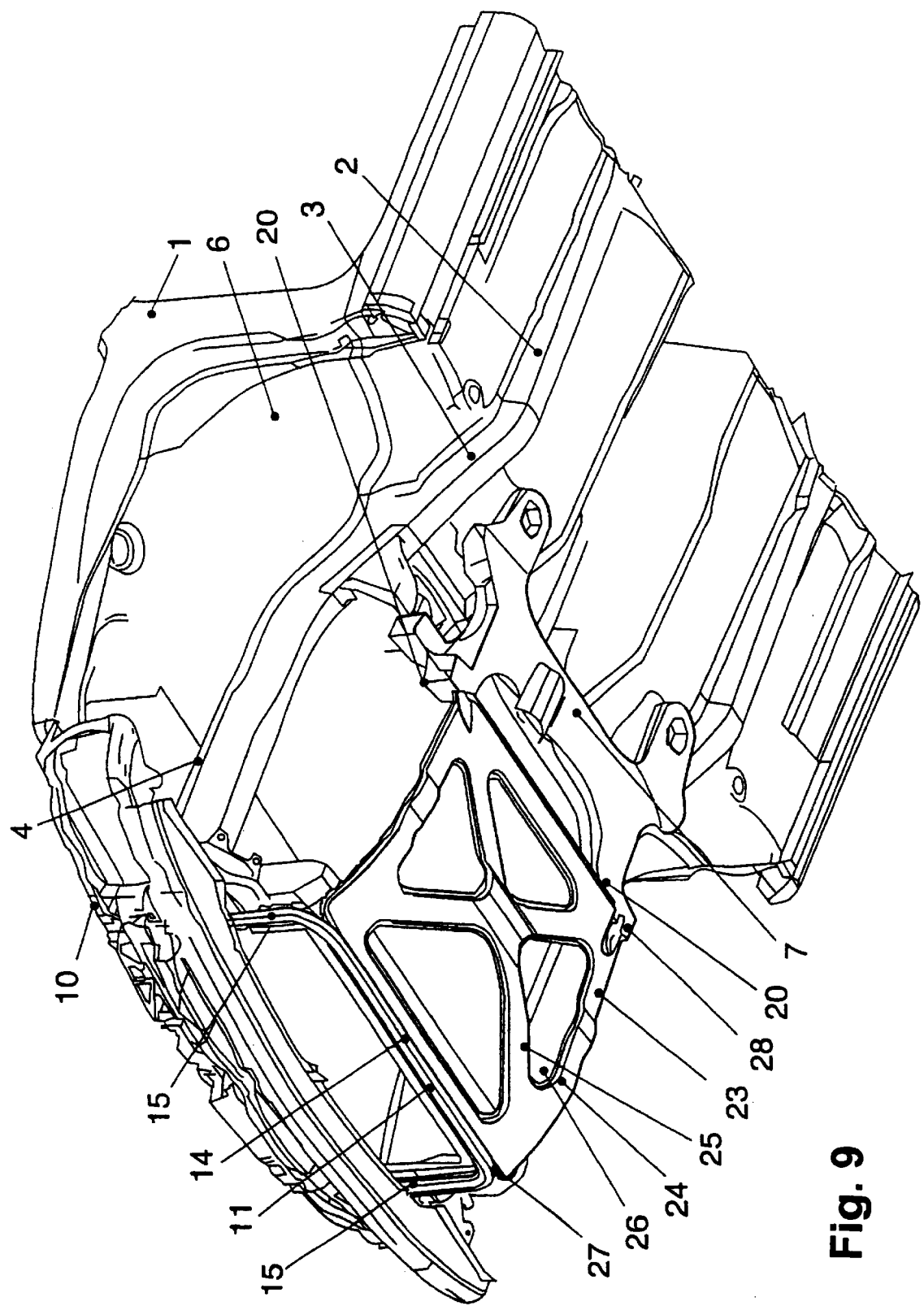
FIG. 9 is a partial, perspective view of a third exemplary embodiment of a vehicle body according to the invention whose crossmember configuration is configured corresponding to that of the first exemplary embodiment shown in FIG. 1, but differs from the latter through the use of a frame-like strutting configuration.

A third exemplary embodiment is illustrated in FIG. 9. This embodiment differs from the first exemplary embodiment according to FIGS. 1 to 4 merely by the configuration of the strutting configuration, with the result that only the differences with regard to the first exemplary embodiment will be discussed here. The strutting configuration in FIG. 9 is configured as a flat thrust frame 23 with an essentially rectangular basic shape. The thrust frame 23 includes a wide outer frame 24 which is reinforced by two diagonal struts 25 which intersect approximately in the center and connect the respectively mutually opposite corners of the outer frame 24 to one another. In the exemplary embodiment illustrated, the thrust frame 23 is configured as an essentially flat sheet-metal element whose strut structure is obtained by punching out approximately triangular recesses 26, four recesses 26 being provided here in the manner of a clover leaf. The thrust frame 23 extends essentially horizontally below an engine compartment 17. In an alternative variant, the thrust frame may also be configured as a closed panel in order to downwardly encapsulate the engine compartment.

As can also be seen from FIG. 9, the thrust frame 23 is coupled to the auxiliary frame 7 at two points 28 which are spaced apart from each other in the transverse direction of the vehicle and are provided on the projections 20 of the auxiliary frame 7. The thrust frame 23 is connected on the front side to the connecting section 14 of the crossmember 11 via a crossbar 27 of the outer frame 24, which crossbar extends in the transverse direction of the vehicle. The fastening to the connecting section 14 is preferably done along the entire length of the crossbar 27, as a result of which a particularly high rigidity of the floor region in the front part of the vehicle can be obtained.

In the case of the third exemplary embodiment illustrated in FIG. 9, as in the first exemplary embodiment the crossmember 11 is provided on the front side in front of a front end frame or module 10.

Figure 10:
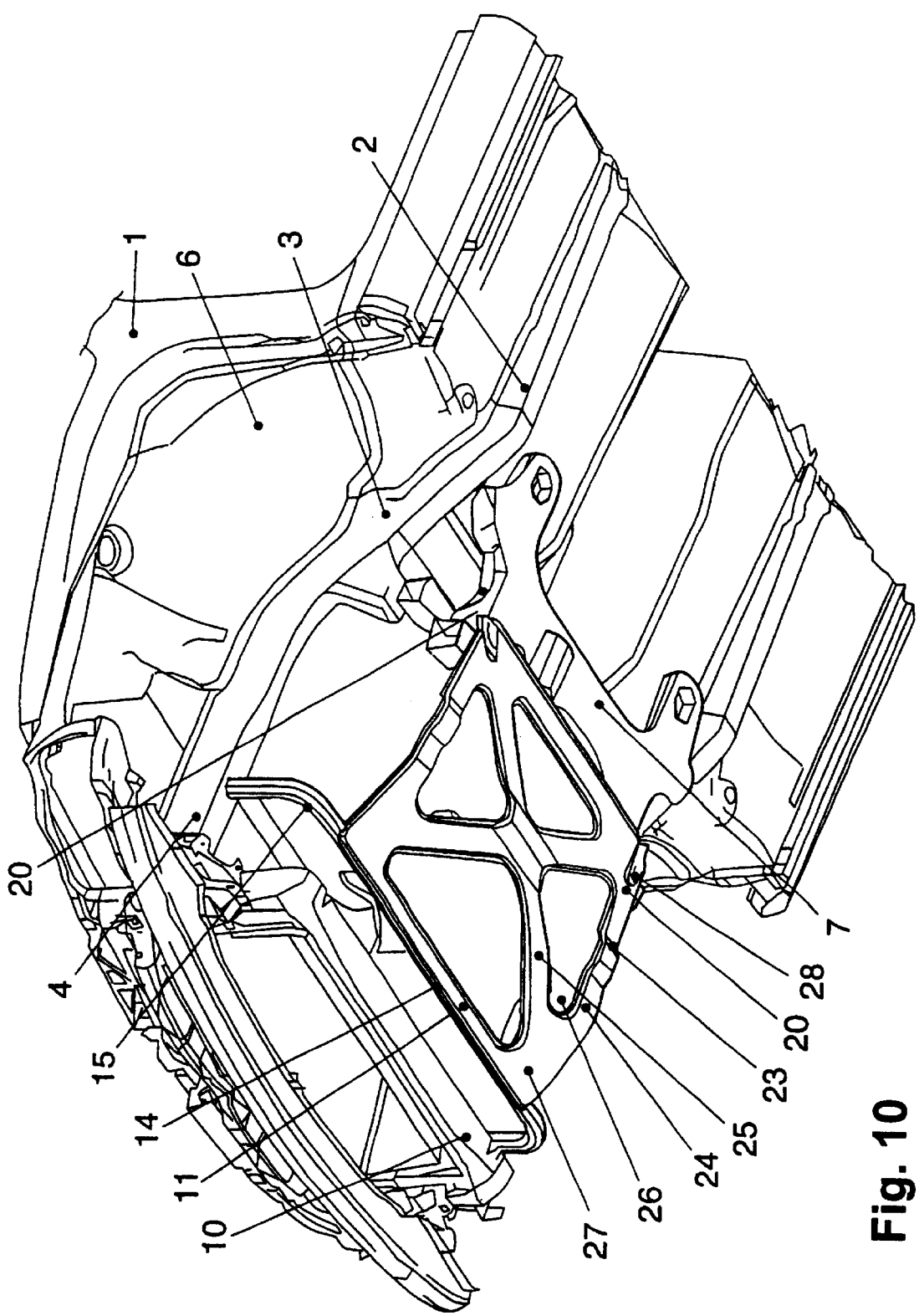
FIG. 10 is a partial, perspective view of a fourth exemplary embodiment of a vehicle body according to the invention whose crossmember configuration is configured corresponding to that of the second exemplary embodiment shown in FIG. 5, but differs from the latter through the use of a frame-like strutting configuration.

A fourth exemplary embodiment is illustrated in FIG. 10 which differs from the second exemplary embodiment according to FIGS. 5 to 8 only by the layout of the strutting configuration. In the case of the fourth exemplary embodiment, the strutting configuration is again configured as a thrust frame 23 which has already been explained above in conjunction with FIG. 9. In contrast to the third exemplary embodiment according to FIG. 9, in FIG. 10 the crossmember 11 is provided directly behind the front end frame or front end module 10 in a front end region of the vehicle body.

The invention has been explained above with reference to four exemplary embodiments in which the stiffening is done on a front part of a vehicle. However, it is readily possible to also provide a similar stiffening on a vehicle rear irrespective of whether, as disclosed in European Patent No. EP 0 603 536 B1, the vehicle engine or else, for example, a luggage storage compartment is accommodated there. The stiffening effect of the vehicle body is independent of whether an engine compartment or a storage compartment is provided at a respective vehicle end.

I claim:

1. A vehicle body, comprising:
   a main frame including an underbody and two longitudinal members, said main frame defining a longitudinal vehicle direction, a transverse vehicle direction and a vehicle end region;
   said longitudinal members extending from said underbody to said vehicle end region such that said longitudinal members are offset upwardly with respect to said underbody;
   an auxiliary frame fastened to said main frame and extending from said underbody toward said vehicle end region;
   a crossmember fastened to said longitudinal members at said vehicle end region;
   said crossmember having a downwardly projecting connecting section disposed substantially level with said auxiliary frame and extending substantially horizontally in the transverse vehicle direction;
   said longitudinal members having respective end sections, said connecting section having axial ends and turning, at said axial ends, into upwardly extending sections extending from said axial ends of said connecting section to said end sections of said longitudinal members;

a strutting configuration extending substantially horizontally from said auxiliary frame toward the vehicle end region, said strutting configuration having a first end fastened to said auxiliary frame at locations spaced apart from one another in the transverse vehicle direction, and said strutting configuration having a second end fastened to said connecting section of said crossmember; and an end frame fastened to said end sections of said longitudinal members, said end frame extending substantially vertically in a plane transverse to the longitudinal vehicle direction, and said crossmember being disposed behind said end frame in the longitudinal vehicle direction.

2. The vehicle body according to claim 1, wherein said crossmember is a one-piece crossmember.

3. The vehicle body according to claim 1, wherein said strutting configuration includes two struts disposed as a V-shaped configuration such that said struts converge in a direction toward the vehicle end region.

4. The vehicle body according to claim 3, wherein both of said struts are articulated at one common point on said crossmember.

5. The vehicle body according to claim 1, wherein said strutting configuration is a flat thrust frame fastened to said crossmember along said connecting section extending substantially horizontally in the transverse vehicle direction.

6. The vehicle body according to claim 1, wherein said strutting configuration is a substantially rectangular outer frame having diagonal struts.

7. The vehicle body according to claim 1, wherein said strutting configuration is a one-piece sheet-metal element having four substantially triangular recesses formed therein, said four substantially triangular recesses are grouped to form a clover leaf configuration.

8. The vehicle body according to claim 1, wherein:

said auxiliary frame has support locations configured to support wheel carriers for carrying wheels defining respective wheel axes; and said auxiliary frame is disposed below the wheel axes, said longitudinal members extend over the wheel axes.

9. The vehicle body according to claim 1, wherein said underbody has a floor panel section disposed between said two longitudinal members, said auxiliary frame is fastened to said floor panel section of said underbody.

10. The vehicle body according to claim 1, wherein said crossmember is fastened to said end frame.

11. The vehicle body according to claim 1, wherein said connecting section of said crossmember is a bar-shaped connecting section.

12. The vehicle body according to claim 1, wherein upwardly extending sections extending from said axial ends of said connecting section upwards to said end sections of said longitudinal members extend substantially vertically upward.

13. A vehicle body, comprising:

a main frame including an underbody and two longitudinal members, said main frame defining a longitudinal vehicle direction, a transverse vehicle direction and a vehicle end region;

said longitudinal members extending from said underbody to said vehicle end region such that said longitudinal members are offset upwardly with respect to said underbody;

an auxiliary frame fastened to said main frame and extending from said underbody toward said vehicle end region;

a crossmember fastened to said longitudinal members at said vehicle end region;

said crossmember having a downwardly projecting connecting section disposed substantially level with said auxiliary frame and extending substantially horizontally in the transverse vehicle direction;

said longitudinal members having respective end sections, said connecting section having axial ends and turning, at said axial ends, into upwardly extending sections extending from said axial ends of said connecting section to said end sections of said longitudinal members;

a strutting configuration extending substantially horizontally from said auxiliary frame toward the vehicle end region, said strutting configuration having a first end fastened to said auxiliary frame at locations spaced apart from one another in the transverse vehicle direction, and said strutting configuration having a second end fastened to said connecting section of said crossmember;

an end frame fastened to said end sections of said longitudinal members, said end frame extending substantially vertically in a plane transverse to the longitudinal vehicle direction; and said crossmember being integrated in said end frame such that said crossmember and said end frame together form a one-piece element.

14. The vehicle body according to claim 13, wherein said strutting configuration includes two struts disposed as a V-shaped configuration such that said struts converge in a direction toward the vehicle end region.

15. The vehicle body according to claim 13, wherein said strutting configuration is a flat thrust frame fastened to said crossmember along said connecting section extending substantially horizontally in the transverse vehicle direction.

16. The vehicle body according to claim 13, wherein said strutting configuration is a substantially rectangular outer frame having diagonal struts.

17. The vehicle body according to claim 13, wherein said strutting configuration is a one-piece sheet-metal element having four substantially triangular recesses formed therein, said four substantially triangular recesses are grouped to form a clover leaf configuration.

18. The vehicle body according to claim 13, wherein:

said auxiliary frame has support locations configured to support wheel carriers for carrying wheels defining respective wheel axes; and said auxiliary frame is disposed below the wheel axes, said longitudinal members extend over the wheel axes.

19. The vehicle body according to claim 13, wherein said underbody has a floor panel section disposed between said two longitudinal members, said auxiliary frame is fastened to said floor panel section of said underbody.

* * * * *